No. 622,784. Patented Apr. 11, 1899.
C. A. ROEPKE.
HINGE.
(Application filed Apr. 4, 1898.)

(No Model.)

Witnesses:

Inventor:
Carl Albert Roepke
By Richardson
his Attorneys.

UNITED STATES PATENT OFFICE.

CARL ALBERT ROEPKE, OF MANCHESTER, ENGLAND.

HINGE.

SPECIFICATION forming part of Letters Patent No. 622,784, dated April 11, 1899.

Application filed April 4, 1898. Serial No. 676,397. (No model.)

*To all whom it may concern:*

Be it known that I, CARL ALBERT ROEPKE, a subject of the Emperor of Germany, residing at Manchester, in the county of Lancaster, England, have invented new and useful Improvements in Hinges, (for which I have obtained provisional protection in Great Britain, No. 20,713, bearing date September 9, 1897,) of which the following is a specification.

My invention relates to improvements in hinge-fastenings for tune-sheets, jacquard-cards, belting, writing-cases, doors, and the like, and has for its object to so form the said fastenings that they are extremely simple in construction, can be very easily and quickly opened, and are very secure when closed. I attain this object by the device illustrated in the accompanying drawings as applied to a tune-sheet, jacquard-card, machine-belt, or the like, and in which—

Figure 1:
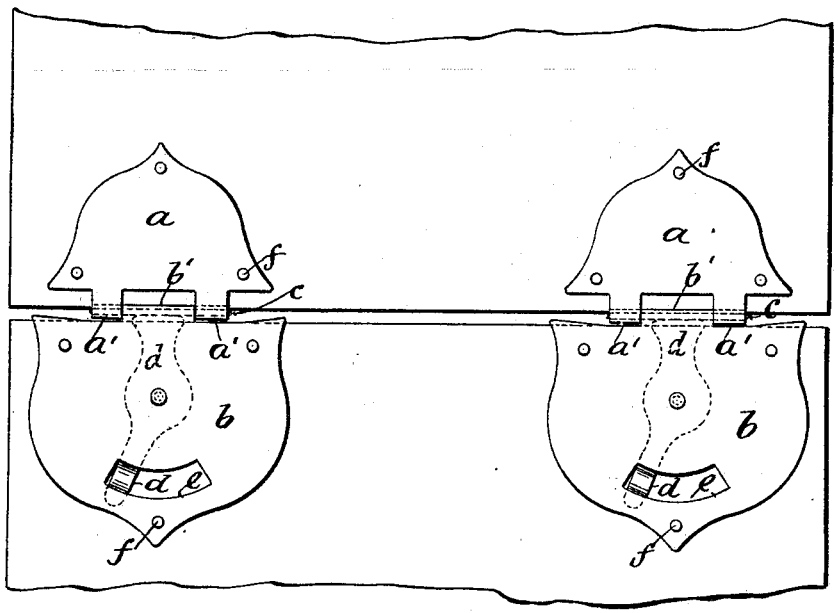
Figure 2:
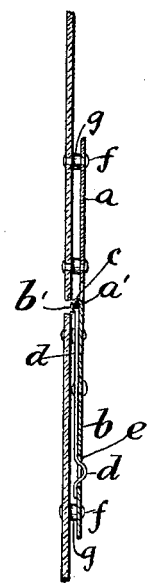
Figure 3:
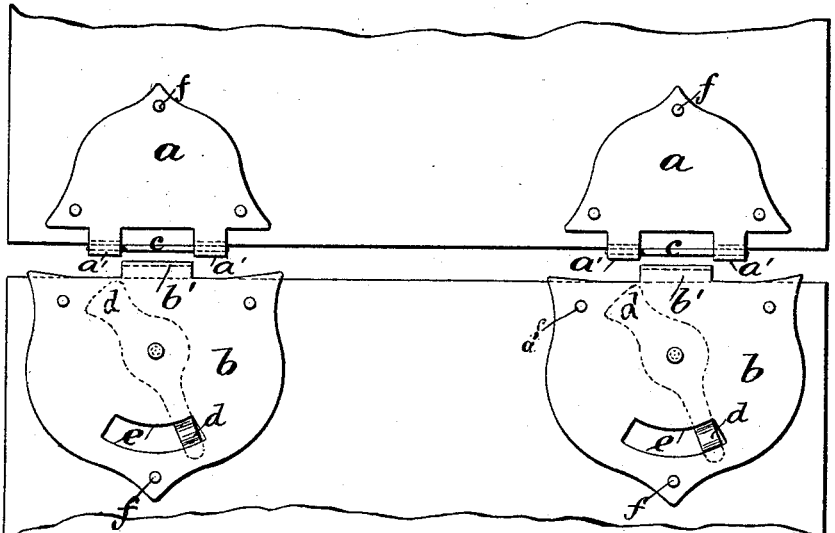
Figure 4:
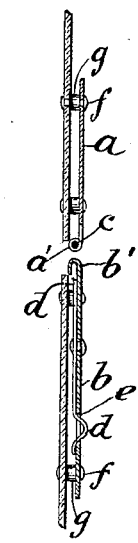

Figures 1 and 3 are elevations and Figs. 2 and 4 sectional end views, Figs. 1 and 2 of the fastening closed, and Figs. 3 and 4 when open.

Similar letters refer to similar parts throughout the several views.

Referring to the figures generally, my improved fastening consists of two plates $a$ and $b$, $a$ of which is formed at the side with two eyes $a'$ $a'$, which are at a suitable distance apart from each other, and the other plate $b$ with one eye $b'$, formed in hook fashion, open at its inner side. The said two eyes are fitted or formed with a pin $c$, adapted to receive the eye $b'$ of the other plate $b$, which is hooked onto the pin $c$ when it is desired to close the fastening, as shown in Figs. 1 and 2.

In order to prevent the plate $b$ becoming unhooked from the plate $a$, a tongue $d$ is pivoted to the plate $b$, the inner end of which is adapted to enter the open side of its eye $b'$ and bear against the pin $c$ of the other plate $a$, thus locking the two plates securely together.

To facilitate the moving and setting of the tongue $d$, its outer end is bent and may project through a segmental slot $e$, formed in the plate $b$.

The plates $a$ and $b$ are secured to the tune-sheet or the like by means of rivets $f$ or the like, small distance-collars $g$ (see Figs. 2 and 4) being interposed to form a space between the tune-sheet and plates for the tongue $d$ to move in.

What I claim as my invention, and desire to secure by Letters Patent, is—

In a hinge-fastening for tune-sheets, jacquard-cards, belting, writing-cases, doors and the like, the combination of two plates $a$ and $b$, $a$ of which is formed with two eyes $a'$, $a'$ carrying a pin $c$ and $b$ of which a hook-shaped eye $b'$ adapted to engage the pin $c$, and a tongue $d$ pivoted to the plate $b$ and having its end adapted to swing laterally into the eye $b'$ on the arc of a circle and parallel with the surface of the plate $b$, all substantially as set forth.

In testimony whereof I have hereunto set my hand, in presence of two witnesses, February 25, 1898.

CARL ALBERT ROEPKE.

Witnesses:
GEORGE C. DOWNING,
W. I. S. RUTER.